(12) United States Patent
Bushue et al.

(10) Patent No.: US 8,513,831 B2
(45) Date of Patent: Aug. 20, 2013

(54) AUTONOMOUS CONTROL IN CURRENT SHARE POWER SUPPLIES

(75) Inventors: Michael Bushue, Santa Clara, CA (US); Drew G. Doblar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 520 days.

(21) Appl. No.: 12/886,730

(22) Filed: Sep. 21, 2010

(65) Prior Publication Data

US 2012/0068544 A1 Mar. 22, 2012

(51) Int. Cl.
*H02J 1/10* (2006.01)

(52) U.S. Cl.
USPC .......................................................... 307/43

(58) Field of Classification Search
USPC .................................... 307/43, 45, 80, 64, 65
See application file for complete search history.

(56) References Cited

U.S. PATENT DOCUMENTS 6,014,322 A * 1/2000 Higashi et al. .................. 363/65

* cited by examiner

*Primary Examiner* — Carlos Amaya
(74) *Attorney, Agent, or Firm* — Osha Liang LLP

(57) ABSTRACT

A method for autonomous control by a power supply unit (PSU) among a number of current share PSUs in a power supply system. The method includes: Receiving input power from a power input feed; setting a mode of the PSU to ON; receiving a first controlled signal including a first number of IStar modes and thresholds; receiving a first activation signal activating IStar in the PSU; receiving a second controlled signal comprising a first voltage; determining that the first voltage is less than a first Active standby OFF threshold for an IStar mode of Active standby OFF; setting the IStar mode for the PSU to Active standby OFF; receiving a third controlled signal that includes a second voltage; determining that the second voltage is greater than a first Active ON threshold for an IStar mode of Active ON; and setting the IStar mode for the PSU to Active ON.

19 Claims, 7 Drawing Sheets

AUTONOMOUS CONTROL IN CURRENT SHARE POWER SUPPLIES

BACKGROUND

Some computer systems require a reliable supply of electrical power. For example, a server used to process sales and accounting transactions may be considered to be a critical to a corporation, and may thus require a continuous supply of electrical power. In such computer systems, electrical power may be provided by multiple power supply units (PSUs). In particular, one (or more) of the PSUs may be held in reserve, to be brought on line in the case of a failure of an active PSU.

Weighing against the performance required of a power supply system is a need to reduce energy consumption. PSUs in a power supply system, if not managed properly, may consume high amounts of energy. Government standards have been enacted to encourage a reduction in the use of power supply systems, both in an effort to conserve resources and to help reduce the energy costs of companies using power supply systems. Further, companies that design power supply systems and their components, including control systems, may be motivated to exceed the government standards that have been created.

SUMMARY

In general, in one aspect, the invention relates to a method for autonomous control by a power supply unit (PSU) among a number of current share PSUs in a power supply system. The method includes receiving, by the PSU, input power from a power input feed, and setting a mode of the PSU to ON. The method further includes receiving, from a controller using a supply bus shared by the current share PSUs, a first controlled signal including a first number of IStar modes and thresholds for the PSU, and receiving a first activation signal activating IStar in the PSU. The method further includes receiving, from the current share PSUs using the supply bus, a second controlled signal comprising a first voltage, and determining that the first voltage is less than a first Active standby OFF threshold for an IStar mode of Active standby OFF for the PSU. The method further includes setting the IStar mode for the PSU to Active standby OFF from the mode of ON, and receiving, from the current share PSUs using the supply bus, a third controlled signal that includes a second voltage. The method further involves determining that the second voltage is greater than a first Active ON threshold for an IStar mode of Active ON for the PSU, and setting the IStar mode for the PSU to Active ON.

In general, in one aspect, the invention relates to a system for autonomous control by a power supply unit (PSU) among a plurality of current share PSUs in a power supply system. The system includes a supply bus, a number of power input feeds, and a number of current share PSUs. The supply bus includes a voltage rail, where the supply bus and voltage rail are operatively connected to each current share PSU within the power supply system. Each power input feed provides input voltage to one of the current share PSUs. Each PSU includes memory for storing instructions executed by a central processing unit (CPU), a charging module that includes a resistor and a switch, and a switching regulator that includes an output capacitor. Each PSU is configured to receive input power from one of the power input feeds, and set a mode of the PSU to ON. Each PSU is further configured to receive, from a controller using the supply bus shared by the current share PSUs, a first controlled signal comprising a first number of IStar modes and thresholds for the PSU, and receive a first activation signal activating IStar in the PSU. Each PSU is further configured to receive, from the current share PSUs using the supply bus, a second controlled signal that includes a first voltage, and determine that the first voltage is less than a first Active standby OFF threshold for an IStar mode of Active standby OFF for the PSU. Each PSU is further configured to set the IStar mode for the current share PSU to Active standby OFF from the mode of ON, and receive, from the current share PSUs using the supply bus, a third controlled signal that includes a second voltage. Each PSU is further configured to determine that the second voltage is greater than a first Active ON threshold for an IStar mode of Active ON for the PSU, and set the IStar mode for the PSU to Active ON.

In general, in one aspect, the invention relates to a computer readable medium comprising computer readable program code embodied therein for causing a power supply unit (PSU) among a plurality of PSUs to perform a method. The method includes receiving, by the PSU, input power from a power input feed, and setting a mode of the PSU to ON. The method further includes receiving, from a controller using a supply bus shared by the current share PSUs, a first controlled signal including a first number of IStar modes and thresholds for the PSU, and receiving a first activation signal activating IStar in the PSU. The method further includes receiving, from the current share PSUs using the supply bus, a second controlled signal comprising a first voltage, and determining that the first voltage is less than a first Active standby OFF threshold for an IStar mode of Active standby OFF for the PSU. The method further includes setting the IStar mode for the PSU to Active standby OFF from the mode of ON, and receiving, from the current share PSUs using the supply bus, a third controlled signal that includes a second voltage. The method further involves determining that the second voltage is greater than a first Active ON threshold for an IStar mode of Active ON for the PSU, and setting the IStar mode for the PSU to Active ON.

Other aspects of the invention will be apparent from the following description and the appended claims.

DETAILED DESCRIPTION

Figure 1A:
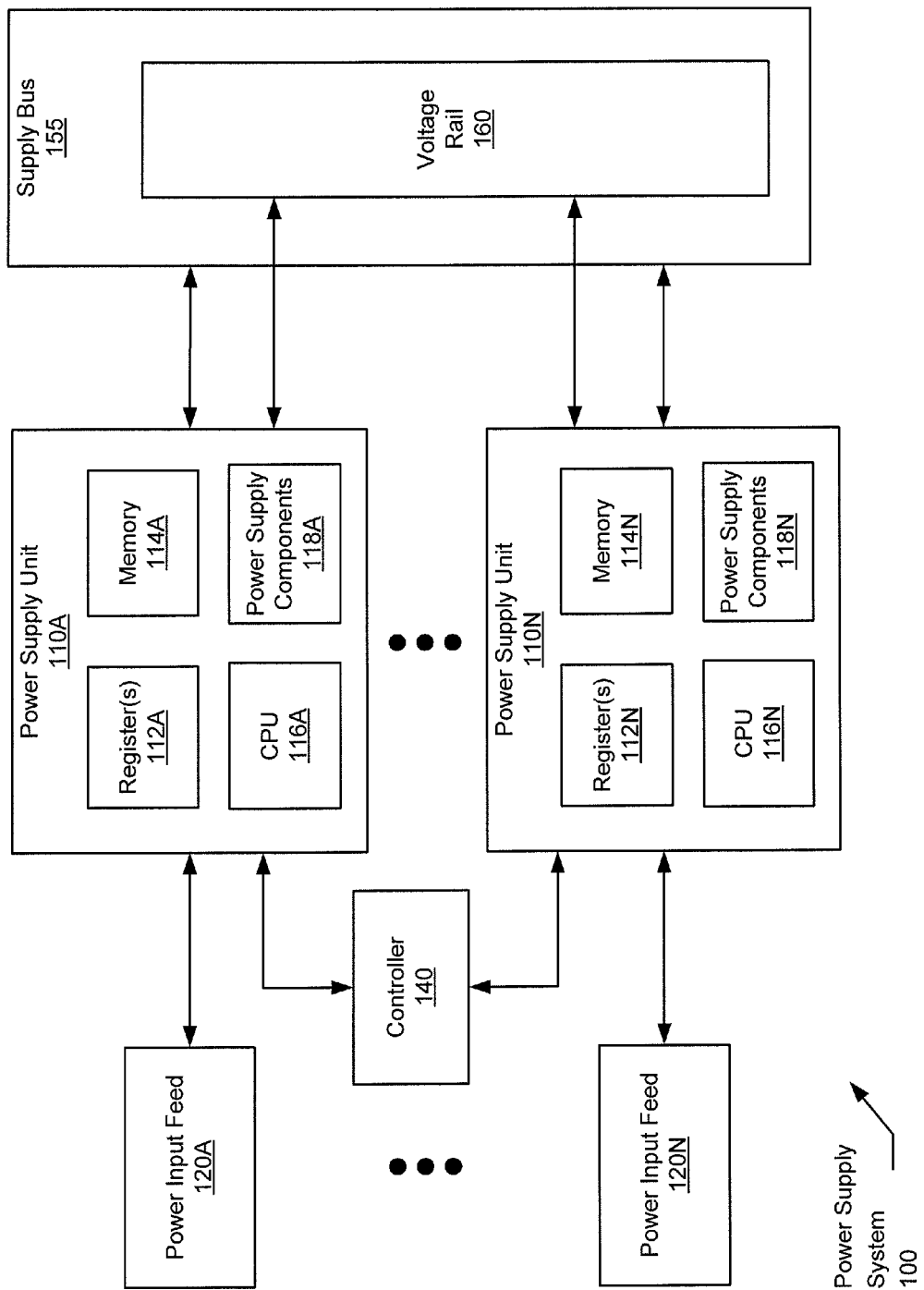
FIG. 1A shows a diagram of a PSU system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for autonomous control in current share power PSUs. More specifically, one or more embodiments of the invention provide a method and system for autonomously controlling modes and thresholds for a PSU among current share PSUs in a power supply system. Autonomous control of a PSU may create more effective and efficient operation of the PSU. Autonomous control of a PSU may also enable a PSU to use less energy. In one or more embodiments of the invention, autonomous control of a PSU may reduce the time required to change the status of a PSU in a PSU network from standby to active. Initiating and/or changing the status of the PSU may involve the use of a controlled signal, which is sent to the PSU from a controller, the other PSUs in the power supply system, or from some other suitable source. A controlled signal may be called by a number of other names, depending, for example, on the control system used. Examples of other names for a controlled signal include, but are not limited to, a control signal, a current share signal, a controller signal, Ishare signal, and an activation signal. Further, terms such as "controller," "control system," "system controller," and "controlling device" may describe a device and/or system that controls each PSU in a power supply system and may be used synonymously.

FIG. 1A shows a diagram of a power supply system (100) in accordance with one or more embodiments of the invention. The power supply system (100) includes multiple power input feeds (e.g., (120A), (120N)), multiple PSUs (e.g., (110A), (110N)), a controller (140), and a supply bus (155). Each PSU includes one or more registers (e.g., (112A), (112N)), memory (e.g., (114A), (114N)), a central processing unit (CPU) (e.g., (116A), (116N)) such as an integrated circuit or other hardware processor, and power supply components (e.g., (118A), (118N)). The supply bus (155) includes a voltage rail (160). Each of these components is described below. One of ordinary skill in the art will appreciate that embodiments of the invention are not limited to the configuration shown in FIG. 1A.

In one or more embodiments of the invention, the power input feed (e.g., (120A), (120N)) is configured to provide power to the PSU. The power provided by a power input feed may be alternating current (AC) or direct current (DC). A power input feed may have more than one connection to a PSU. For example, a phase-to ground to connection may have two connections to the PSU, while a three-phase-to-ground connection may have four connections to the PSU. In one or more embodiments of the invention, the power provided by the power input feed is designed and sized to provide a particular level and type of power to the PSU to which the power input feed is connected. One or more power input feeds may be connected to a different source of power than the remaining power input feeds in the power supply system.

In one or more embodiments of the invention, the power supply system (100) provides electrical power to a single computing device (e.g., a server, mainframe, desktop PC, laptop, PDA) or to a collection of computing devices (e.g., a blade server, a server rack, a computing cluster). The power supply system (100) may include any number of power supply units (PSUs). Typical power supply system architecture uses an even number of PSUs. Those skilled in the art will appreciate that a number of different power supply system architectures exist. Such architectures may provide redundancy of power input feeds and/or PSUs.

In one or more embodiments of the invention, each PSU is configured to receive input power from a power input feed and send output power to the voltage rail (160). In one or more embodiments, a PSU converts alternating current (AC) (received from a power input feed) to direct current (DC) (sent to the voltage rail). A PSU may also convert AC to DC. Further, a PSU may change (e.g., reduce, increase) a first DC voltage to a second DC voltage. In one or more embodiments, the PSU may change a first AC voltage to a second AC voltage.

In one or more embodiments, each register (e.g., (112A), (112N)) may be an electronic memory location configured to store configuration settings for the PSU (e.g., (110A), (110N)). The configuration settings may be part of a control system and received from the controller (140), a number of PSUs in a power supply system, or any other suitable source. The following list includes examples of registers that may be included in the PSU, according to one or more embodiments:

ISSEL—IStar indicator, indicates that the PSU is configured to participate in IStar system mode.
ISHARE—indicates the level of the controlled signal, common to all power supplies.
ISON—indicates the level of the ACTIVE ON threshold.
ISOFF—indicates the level of the ACTIVE STANDBY OFF threshold.
ISDRIP—IStar drip indicator, indicates that the ACTIVE STANDBY OFF threshold is to be incremented.
ISFAULT—IStar fault indicator, indicates a fault in a power supply.
ISREENABLED—Indicates that IStar system mode may be reentered.
ISOFFONLOTS—Indicates excessive transitions from ACTIVE STANDBY OFF to ACTIVE ON states within a time window. This signal is latched within the PSU until cleared by the system.
EXCESSIVE_ISFAULT—Indicates excessive ISFAULT events. This signal is latched within the PSU until cleared by the system.
IS_STATE_FORCE—Indicates that the IStar state is forced by system controller.
IS_STATE—Indicates IStar system mode.
IS_ASOFF_COUNT_LIMIT—Indicates the IStar ACTIVE STANDBY OFF count limit (number of entries into ACTIVE STANDBY OFF that triggers a required reduction of ISOFF.
IS_ASOFF_COUNT_INTERVAL—Indicates the interval over which entries into IStar ACTIVE STANDBY OFF are counted.
IS_STEPUP_SIZE—Indicates Istar threshold step up size number of LSBs by which ISOFF is incremented by each handling of ISDRIP.
IS_STEPDOWN_SIZE—Indicates the IStar threshold step down size.
IS_DRIP_INTERVAL—Indicates the IStar interval of time after which the ACTIVE STANDBY OFF threshold is incremented by the IS_STEPUP_SIZE.
IS_FAULT_FORCE—Indicates an IStar fault force.
IS_FAULT_ENABLE—Indicates an IStar fault enable.
IS_FAULT_ON_TIME—Indicates the minimum time for which the PSU remains ON after ISFAULT becomes active. After this time, the PSU enters ON state with IStar disabled.
IS_PSU_NAME—Indicates an ID for the PSU.
IS_FAULT_COUNT_LIMIT—Indicates an IStar fault count limit.
IS_FAULT_COUNT_INTERVAL—Indicates an IStar fault count limit interval.

In one or more embodiments of the invention, the CPU (e.g., (116A), (116N)) is a central processing unit. The CPU may be a single-core processing chip, a multi-core processing chip, or a multi-chip module including multiple multi-core processing chips. Those skilled in the art will appreciate that the CPU may be known by other names, including but not limited to a processor, an integrated circuit, a microprocessor, and a multi-core processor. In one or more embodiments of the invention, the memory (e.g., (114A), (114N)) may include one or more cache memories, main memory, and/or any other suitable type of memory (e.g., random access memory (RAM), cache memory, flash memory). The memory (or portions thereof) may also be part of the CPU.

The power supply components (e.g., (118A), (118N)) are described below with respect to the example single line diagram shown with respect to FIG. 1B.

In one or more embodiments of the invention, the supply bus (155) is configured to share voltages, input/output signals, fault detection signals, and other appropriate signals between PSUs in the power supply system (100). The supply bus may include a number of parallel and/or serial control buses or channels. The supply bus may be configured to facilitate more than one channel of communication, voltage, and/or current. For example, the supply bus may include the voltage rail (160). In one or more embodiments of the invention, the voltage rail (160) of the supply bus (155) is configured to send and receive operating voltages and/or currents of each PSU in the power supply system. For example, the voltage rail may be used to receive 12V outputs (i.e., normal operating voltage for a PSU that is on) from one or more PSUs within a power supply system. Some or all of the supply bus (155) may be implemented on any medium for data communication (e.g., wire cable, fiber-optic cable, wireless connection). Further, the supply bus (or portions thereof) may be implemented using any network standard (e.g., Inter-Integrated Circuit Bus, SMBus, PMBus, Ethernet, Token Ring, WiFi, Bluetooth, ZigBee).

One or more embodiments of the invention are designed to operate in conjunction with a control system sending and receiving instructions using the controller (140). The controller may be used to manage, to some degree, the operation of each PSU in a power supply system. The controller may communicate by sending and/or receiving one or more controlled signals. The controller may be powered by a dedicated power input feed or by a power input feed shared by a PSU or some other device in the power supply system. The controller may also be connected to an uninterruptible power supply (not shown) for continuous operation.

In one or more embodiments of the invention, controlled signals of a control system may be shared between PSUs in a power supply system. A sharing of controlled signals (both input and output) between PSUs on a supply bus in a power supply system may occur continuously or from time to time. In other words, the supply bus may be configured to send a controlled signal (in the form of voltage or current) to each of the PSUs connected to the supply bus. The supply bus may also receive a controlled signal from a PSU, where the controlled signal is sent to the controller (140) and/or to other PSUs in the power supply system. Such a bidirectional controlled signal may, for example, indicate the output power of each PSU in the power supply system as a percentage of the maximum output power or the actual output power for each PSU.

In one or more embodiments of the invention, a controlled signal may be an average (e.g., mean, median) of the output (or percentage of the output) of all PSUs in the power supply system. In one or more embodiments of the invention, the controlled signal is an average of the output of all enabled PSUs (i.e., PSUs operating in the IStar mode of Active ON) in the power supply system. The output may be the actual output power of the PSU, the maximum output power of the PSU, or some other measure of output of the PSU. In such a case, it is possible that the controlled signal may decrease slightly after a PSU in the power supply system changes its IStar mode from Active standby OFF to Active ON (described below). The controlled signal may also be a summation of the output (or percentage of the output) of all PSUs in the power supply system. Those skilled in the art will appreciate that the controlled signal may be configured in various other ways to communicate with the PSUs in the power supply system.

In one or more embodiments of the invention, a controlled signal sent through the supply bus to each of the PSUs connected to the supply bus is used in conjunction with a control system to manage each of the PSUs in the power supply system. For example, a controlled signal (whether from one or more PSUs in a power supply system or from a controller) may instruct a PSU to turn on, to turn off, to go into active standby off mode, to go into active standby on mode, to modify settings, or to perform some other instruction. A controlled signal may also supply thresholds and modes to a PSU so that the PSU may operate autonomously. Two examples of a control system where a controlled signal is sent to one or more PSUs in a power supply system are the IStar control system and the Light Load Efficiency Mode (LLEM) control system. In one or more embodiments of the invention, the LLEM control system is used to detect a fault in the power supply system. LLEM may also be part of the IStar control system or some other control system.

In one or more embodiments of the invention, IStar is a power supply design and method of control of a power supply system to manage the PSUs in a manner that increases energy efficiency. The IStar control system operates differently than many conventional control systems. For one, the IStar control system is delegated to each PSU in a power supply system. This allows for each PSU, once it receives initial thresholds and settings from the controller (140), to provide autonomous control for normal operation without intervention from a central control source. In other words, the PSU can operate in IStar without any further monitoring or instruction from the controller.

IStar features at least two different modes: Active standby OFF and Active ON. In one or more embodiments of the invention, the IStar features a more energy efficient standby mode for a PSU. The standby mode in IStar is Active standby OFF. In the IStar mode of Active standby OFF, unnecessary functions of the PSU are quiesced so that only internal monitoring and control functions (i.e., functions that have low power usage) are active. Further, the input power factor correction (using the PFC module, described below with respect to FIG. 1B) is peak charged. In other words, the power factor is at or near unity, and so the most, if not all, available power for the PSU may be utilized for the monitoring and control functions required during Active standby OFF mode. The IStar mode of Active ON is similar to the characteristics of a PSU mode of ON outside of IStar control.

In one or more embodiments of the invention, under IStar control, the PSUs in a power supply system initially receive IStar modes and thresholds from a controlled signal sent by the controller (140). The IStar modes and thresholds may be unique to each PSU in the power supply system. In one or more embodiments, the controlled signal sent by the controller under IStar dictates an order under which each PSU in the power supply system is instructed to activate (i.e., change IStar mode to Active ON). The order dictated by the controlled signal may be implied by the threshold for Active ON assigned to each PSU. For example, a PSU that is designed to change its mode to Active ON first among the current share PSUs in the power supply system may receive a threshold of 0.1V for Active ON. Further, a PSU that is designed to change its mode to Active ON second among the current share PSUs in the power supply system may receive a threshold of 0.2V for Active ON.

In one or more embodiments of the invention, the threshold for the IStar mode of Active standby OFF includes a default value, a range of potential threshold values, and an initial threshold value. While the threshold values herein are described as voltages, the threshold values may be other types of values, including but not limited to current (measured in Amperes). The default value may represent a maximum value allowed for the IStar mode of Active standby OFF.

Further, in one or more embodiments of the invention, the threshold for the IStar mode of Active ON includes a default value, a range of potential threshold values, and an initial threshold value. While the threshold values for the IStar mode of Active ON may be of the same type (e.g., voltage in volts, current in amperes) as the threshold values for the IStar mode of Active standby OFF. The default value may represent a minimum value allowed for the IStar mode of Active ON.

In one or more embodiments of the invention, for a particular controlled signal sent to a PSU by the controller (140), any and all threshold values associated with the IStar mode of Active standby OFF are less than any and all threshold values associated with the IStar mode of Active ON. In other words, there may be a gap between the highest possible threshold value for the IStar mode of Active standby OFF and the lowest possible threshold value for the IStar mode of Active ON.

In one or more embodiments of the invention, the rationale for having the gap between the highest possible threshold value for the IStar mode of Active standby OFF and the lowest possible threshold value for the IStar mode of Active ON is because the controlled signal delivered to each PSU has an error tolerance that may range from +/−5% to +/−15%. Further, a power supply operating at low load (e.g., 20% of its maximum load) may have an error tolerance that ranges from +/−1% to +/−3%. As a result, to avoid enabling an incorrect IStar mode based on a controlled signal received by a PSU, the threshold value for the IStar mode of Active standby OFF may be set at least 4% (in terms of the total output capability for a PSU) lower than the threshold value for the IStar mode of Active ON. Further, the gap between the thresholds for the IStar modes of Active ON and Active standby OFF helps to provide hysteresis in the on/off function. In other words, a PSU avoids unnecessary and frequent switching between the IStar modes of Active ON and Active standby OFF that would otherwise by caused by the time-varying load.

In one or more embodiments of the invention, a separate activation signal is needed to activate IStar in each PSU. The activation signal may be sent by the controller (140), by one or more of the current share PSUs in the power supply system, or any other suitable device. The activation signal may also be part of the controlled signal sent by the controller.

In one or more embodiments of the invention, after receiving an activation signal, each PSU is designed to operate autonomously while under IStar control using the controlled signal. The controlled signal may be continuous or discrete. A discrete controlled signal may be sent on regular intervals or on a random basis. In one or more embodiments of the invention, the controlled signal is an aggregation of all signals emitted by each PSU in the power supply system. The level of each controlled signal received by a PSU is checked against its current thresholds to determine whether a different mode (whether under IStar control or not) should be enabled. Controlled signals may be serialized on serial buses (e.g., supply bus), sent in parallel over parallel buses, or any suitable combination thereof.

In one or more embodiments of the invention, the thresholds of an IStar mode may be adjusted under certain conditions. The conditions, described in more detail below with respect to FIGS. 2A-2C, may be programmed into the PSU, set by the controller as part of the activation signal, using some other signal or device, or any suitable combination thereof. In one or more embodiments of the invention, a goal of a PSU operating under IStar is to set the threshold value for the IStar mode of Active standby OFF as high as possible. The rationale for such a goal may be to utilize the significant energy efficiency and associated energy savings that the IStar mode of Active standby OFF generates compared to other standby modes outside of IStar. After receiving the activation signal, a PSU under IStar control may be configured to make adjustments to a threshold for any IStar mode without further instruction from or intervention by the controller.

In one or more embodiments of the invention, each PSU under IStar control also has the ability to perform other dynamic functions, including but not limited to fault detection or other absence of a PSU in the power supply system, creating a new order of activation within the power supply system, and establishing new thresholds for each IStar mode. Further, PSUs operating under IStar may utilize signals from, or otherwise operate in conjunction with, other control systems. For example, a signal designating a fault in the power supply system may be supplied to the IStar control system by a different control system, such as LLEM. Alternatively, LLEM (or an equivalent signal) may be integrated with IStar and used to monitor fault conditions in the power supply system. When LLEM sends a fault signal in response to detecting a fault, each PSU may respond to the fault signal from the LLEM while operating in IStar mode.

In one or more embodiments of the invention, the controller is configured to reconfigure the power supply system by sending a subsequent controlled signal that supersedes the previous controlled signal sent to the PSUs in the power supply system. The controller may also be configured to send an activation signal to the PSUs to activate IStar in each PSU after a fault, which disabled IStar in the power supply system, has been cleared.

However, because only necessary functions are active when the PSU is in active standby OFF mode, the latency to change the mode of the PSU to active ON may take longer than it takes to switch from standby to ON for a PSU not under IStar control. Utilization of one or more embodiments of the charging module described herein reduces latency. Thus, using one or more embodiments of the charging module for a PSU operating under IStar control allows for overall reduced power consumption with no loss of (or, in some cases, an increase in) performance of the PSU.

Figure 1B:
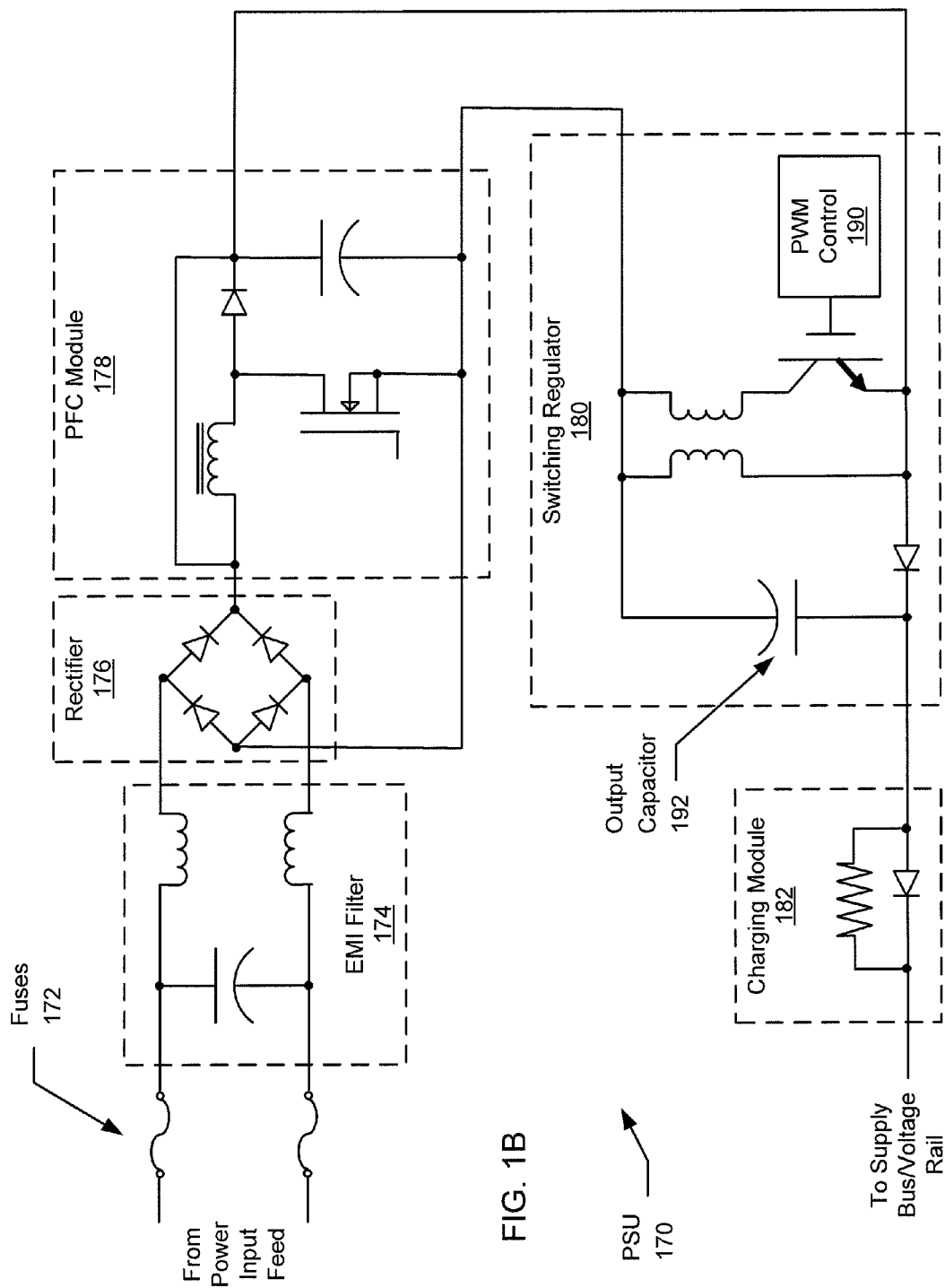
FIG. 1B shows a single line diagram of a PSU in accordance with one or more embodiments of the invention.

FIG. 1B shows a single line diagram of a PSU (170), corresponding to the power supply components described above with respect to FIG. 1A, in accordance with one or more embodiments of the invention. The PSU (170) includes one or more fuses (172), an electromagnetic interference (EMI) filter (174), a rectifier (176), a power factor correction (PFC) module (178), a switching regulator (180), and, optionally, a charging module (182). Each of these components is described below. One of ordinary skill in the art will appreciate that embodiments of the invention are not limited to the configuration shown in FIG. 1B.

In one or more embodiments of the invention, the fuses (172) are configured to disconnect a PSU from a power input feed. The fuse may be designed to internally destruct when a voltage and/or current that passes through it exceeds a level. When the fuse internally destructs, the circuit from the power input feed to the PSU is opened, which stops the flow of voltage and/or current from the power input feed to the PSU. The fuse may be replaced after it internally destructs. The fuse may be sized (internally destructs for different voltage and/or current levels) according to specifications required by the PSU. In other words, the fuse may be designed to prevent an overvoltage and/or overcurrent from passing through the PSU, potentially destroying other components within the PSU that are not designed to operate at higher voltages and/or currents.

In one or more embodiments of the invention, the EMI filter (174) is configured to reduce electromagnetic interference that could affect the electrical circuitry within the PSU. The EMI filter (204) may include a number of different electrical components used in a number of different combinations. For example, an EMI filter may include one or more inductors and one or more capacitors, as shown in FIG. 1B. An EMI filter may also include other electrical components, including but not limited to one or more resistors, capacitors, and/or inductors.

In one or more embodiments of the invention, the rectifier (176) is configured to convert AC power to DC power. In such a configuration, the AC power originates from the power input feed, and the supply bus, including the voltage rail, requires DC power. The rectifier may also be replaced by an inverter to convert DC power from the power input feed to AC power supplied to the supply bus. The rectifier may also be replaced by a step-up transformer or a step-down transformer to increase or decrease (respectively) a voltage or current while keeping the power of the same type (i.e., AC or DC) on both sides of the transformer.

In one or more embodiments of the invention, the PFC module (178) is configured to allow full use of the available power received from the power input feed through the rectifier. The PFC module may include a number of different electrical components used in a number of different combinations. For example, a PFC module may include one or more inductors, one or more field-effect transistor, one or more diodes, and one or more capacitors, as shown in FIG. 2. A PFC module may also include other electrical components, including but not limited to one or more resistors and one or more integrated circuits with logic gates and timers.

In one or more embodiments of the invention, the switching regulator (180) is configured to receive continuous power from the PFC module, separate the power into discrete segments of power, and send the discrete segments of power to the supply bus. The switching regulator may include a number of different electrical components used in a number of different combinations. For example, a switching regulator may include one or more inductors, one or more diodes, an electrical switch (e.g., a field-effect transistor (FET)), a controller (e.g., a pulse width modulation (PWM) controller (190)), and one or more capacitors, as shown in FIG. 1B. A switching regulator may also include other electrical components, including but not limited to one or more resistors and one or more integrated circuits with logic gates and timers. In one or more embodiments, a switching regulator may also act as a rectifier, converter, step-up transformer, or step-down transformer. A capacitor of the switching regulator may be referred to as an output capacitor (192). The output capacitor of the switching regulator may be a single capacitor, multiple capacitors connected in parallel, or multiple capacitors connected in series. The output capacitor may be sized in such a manner to maintain a voltage that is approximately the same as the voltage rail of the supply bus. The output capacitor may be used in conjunction with the charging module, as described below. In one or more embodiments of the invention, one terminal of the charging capacitor is connected to ground (not shown). The charging capacitor may be sized in such a manner to discharge a voltage that is approximately the same voltage of the voltage rail of the supply bus.

Optionally, in one or more embodiments of the invention, the charging module (182) is configured to reduce latency when activating a PSU. The charging module may include a resistor, connected to the output capacitor of the switching regulator and the supply bus, placed in parallel with a switch. The switch may be, for example, a diode, a type of FET (e.g., metal-oxide semiconductor FET (MOSFET)), or any other suitable switch. In one or more embodiments of the invention, the switch includes gate driver circuitry (not shown) to regulate how much, if any, power flows from one end of the FET switch to the other end. For example, the gate driver circuitry may allow power to flow from the end of the switch connected to the output capacitor to the opposite end of the switch (connected, for example, to the supply bus). As another example, the gate driver circuitry may not allow power to flow in the opposite direction through the switch (e.g., from the supply bus through the switch to the output capacitor).

In one or more embodiments of the invention, the value of the resistor is between 1,000 ohms and 10,000 ohms. The resistor may be called a bleed resistor. The resistor may be used to charge the output capacitor of the switching regulator when the PSU is off or in a mode equivalent to off (e.g., active standby OFF). The resistor may be a single resistor, multiple resistors connected in parallel, multiple resistors connected in series, an active charging circuit (e.g., an active current circuit with its power derived), or any other suitable component or device with characteristics similar to a resistor. Further, the charging module may have its own output capacitor (not shown), in which case some or all of the description above with regard to the output capacitor of the switching regulator applies to the output capacitor of the charging module.

Figure 2A:
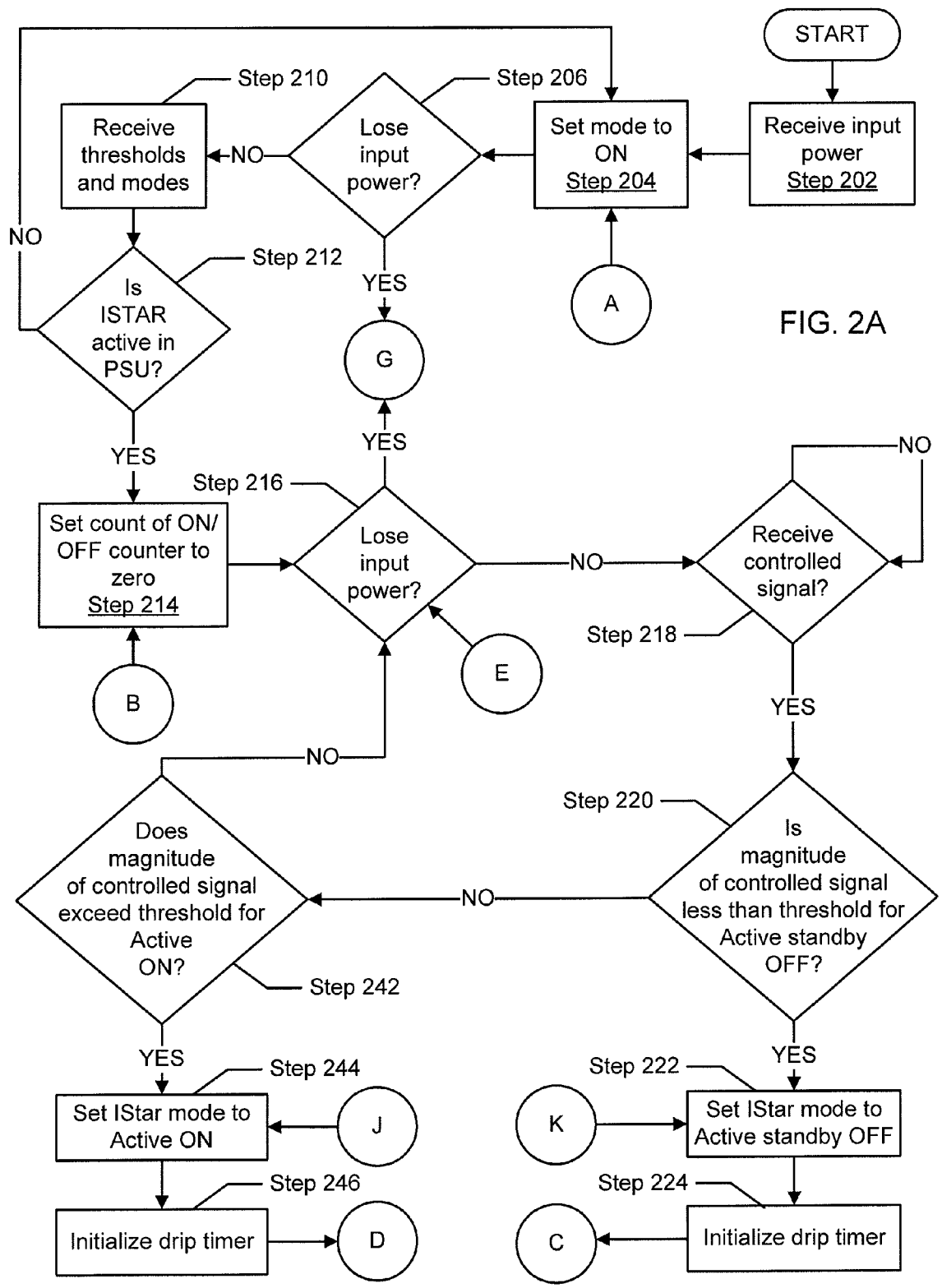
FIGS. 2A-2C show flowcharts of a method in accordance with one or more embodiments of the invention.
Figure 2B:
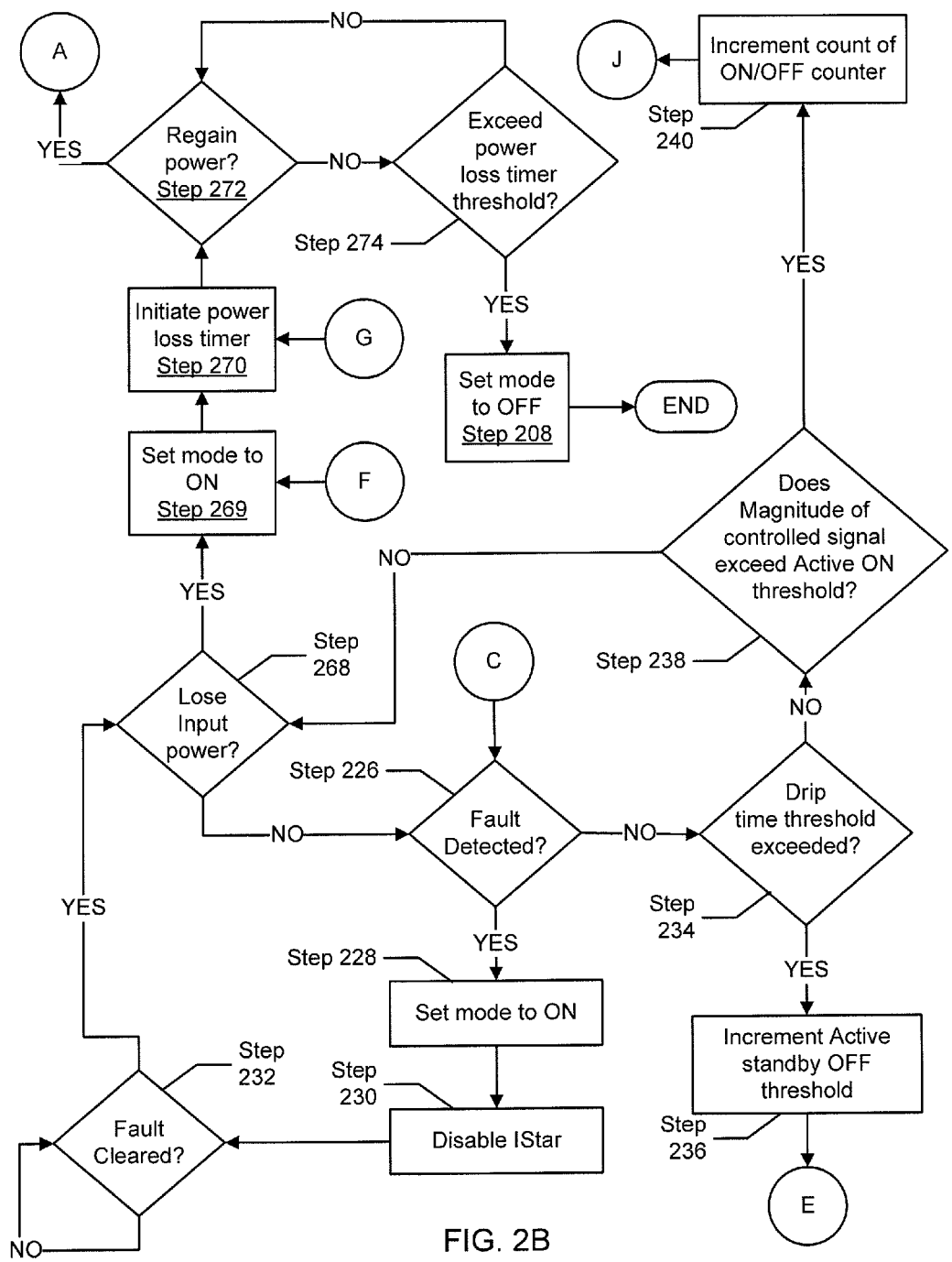
Figure 2C:
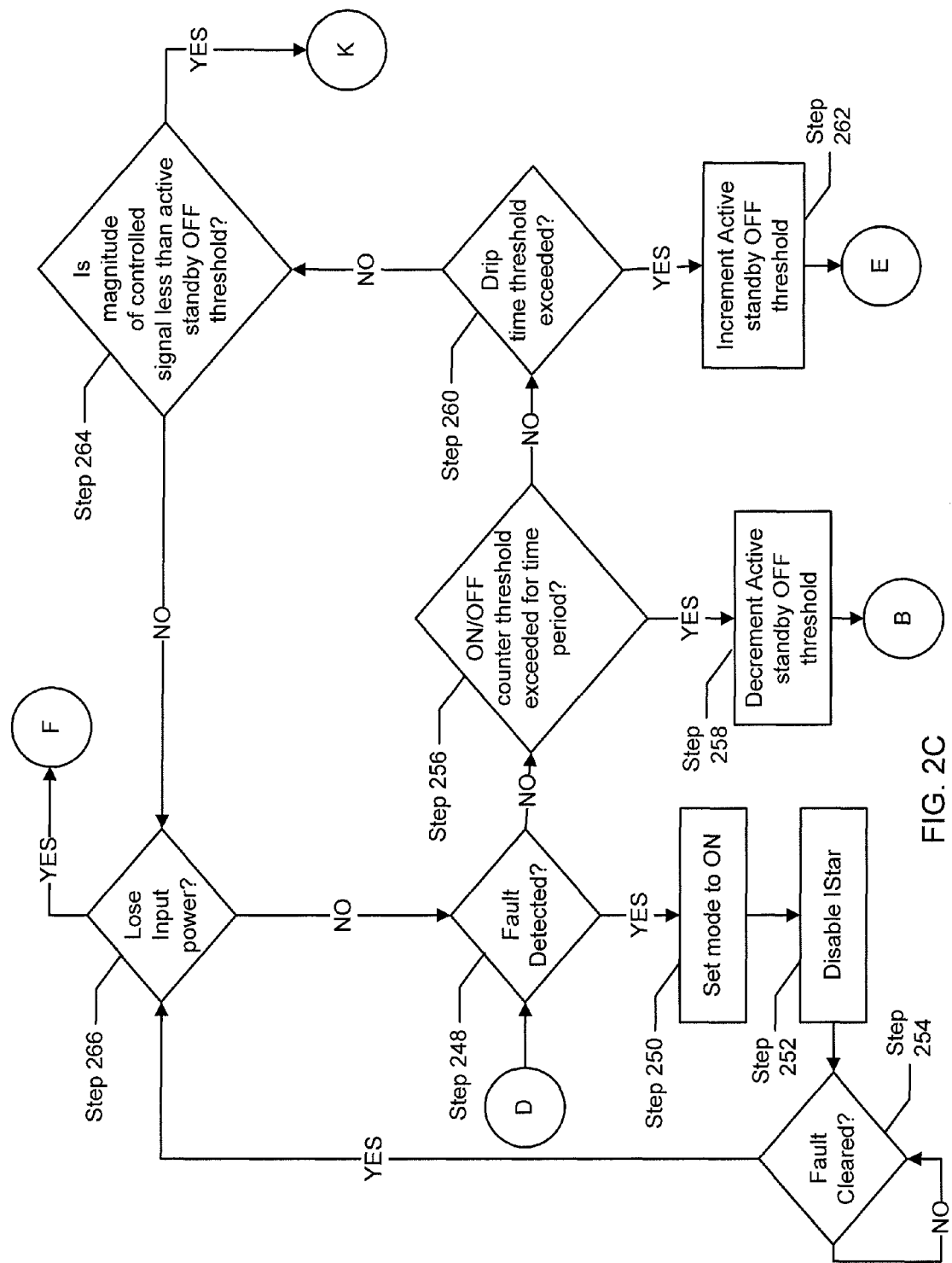

FIGS. 2A-2C show a flowchart of a method for autonomous control of a PSU among current share PSUs in a power supply system in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 2A-2C, may be included in performing this method. Accordingly, the specific arrangement of steps shown in FIGS. 2A-2C should not be construed as limiting the scope of the invention.

Referring to FIG. 2A, in Step 202, input power is received. In one or more embodiments of the invention, the input power is received from a power input feed. Input power may also be received from other sources of power, such as, for example, from the voltage rail of the supply bus. In Step 204, the mode of the PSU is set to ON. The ON mode may be, for example, automatic ON, active standby ON, or some other form of ON setting. In one or more embodiments of the invention, the ON mode of the PSU is outside of IStar control, and so is not an IStar mode. In Step 206, a determination is made as to whether input power to the PSU has been lost. If input power to the PSU has been lost, then the process proceeds to Step 266, where a power loss timer is initiated. If input power to the PSU has not been lost, then the process proceeds to Step 210.

In Step 210, thresholds and modes are received by the PSU. In one or more embodiments of the invention, the controller sends the thresholds and modes to the PSU. The thresholds and modes may be sent using the supply bus, the voltage rail, or some other reasonable medium for sending the thresholds and modes. The thresholds may be sent as a controlled signal or series of controlled signals. The thresholds and modes may be broadcast to all PSUs in the power supply system. The thresholds and modes received by a PSU may also be created for, and sent to, a particular PSU in the power supply system. Each mode may have one or more thresholds. The thresholds may be defined in terms of a signal received by the PSU, such as a low voltage signal or a controlled signal. The modes received by the PSU may be modes in IStar operation, including but not limited to Active standby OFF and Active ON. The thresholds for a mode may include a default value and a range of operating thresholds. For example, a mode of Active standby OFF may have a default (e.g., a maximum threshold value) of 0.6V, an initial threshold value of 0.5V, and a range of operating threshold values of 0.3V and 0.59V.

In step 212, a determination is made as to whether IStar is active in the PSU. In one or more embodiments of the invention, IStar is a control system, as described above with respect to FIG. 1A. For IStar to be active, the PSU may receive controlled signals from the other PSUs in the power supply system and use such controlled signals to determine the appropriate operating mode of that PSU. If IStar is not active, then the process reverts to Step 204, where the mode of the PSU remains ON, outside of IStar operation. If IStar is active, then the process proceeds to Step 214. In one or more embodiments of the invention, IStar may be active in one or more PSUs in a power supply system while being inactive in one or more other PSUs in the power supply system.

In Step 214, a count of an ON/OFF counter is set to zero. In one or more embodiments of the invention, the ON/OFF counter is used to lower the threshold to set the IStar mode of the PSU to Active standby OFF. The ON/OFF counter may count the number of times within a period of time that the IStar mode of the PSU changes from Active ON to Active standby OFF and back to Active ON. The count of the ON/OFF counter may only increment when the IStar mode changes from Active standby OFF to Active ON.

In Step 216, a determination is once again made as to whether input power to the PSU has been lost. If input power to the PSU has been lost, then the process proceeds to Step 266, where a power loss timer is initiated. If input power to the PSU has not been lost, then the process proceeds to Step 218. In Step 218, a determination is made as to whether a controlled signal is received. The controlled signal may be received from the supply bus. The controlled signal may be sent by a controller that communicates with all PSUs in the power supply system. The controlled signal may also be sent by the current share PSUs in the power supply system. In one or more embodiments of the invention, the controlled signal is a fraction of (e.g., an order of magnitude less than) an amount of power measured at the voltage rail. The controlled signal may be a level of voltage that triggers a change from ON mode to an IStar control mode, such as Active standby OFF or Active ON. In one or more embodiments of the invention, the controlled signal may be received continuously. The controlled signal may also be received in discrete increments at regular intervals or in random intervals.

In Step 220, a determination is made as to whether the magnitude of the controlled signal received from the supply bus is less than the threshold for the IStar mode of Active standby OFF. The threshold for the IStar mode of Active standby OFF may be the same as the threshold received from the controller, as described above with respect to Step 210. The threshold for the IStar mode of Active standby OFF may also be a threshold determined by the PSU in its autonomous control under IStar. If the magnitude of the controlled signal received from the supply bus is not less than the threshold for the IStar mode of Active standby OFF, then the process proceeds to Step 242. If the magnitude of the controlled signal received from the supply bus is less than the threshold for the IStar mode of Active standby OFF, then the process proceeds to Step 222.

In Step 242, a determination is made as to whether the magnitude of the controlled signal received from the supply bus is greater than the threshold for the IStar mode of Active ON. The threshold for the IStar mode of Active standby OFF may be the same as the threshold received from the controller, as described above with respect to Step 210. The threshold for the IStar mode of Active standby OFF may also be a threshold determined by the PSU in its autonomous control under IStar. If the magnitude of the controlled signal received from the supply bus is not greater than the threshold for the IStar mode of Active ON, then the process reverts to Step 216. In other words, the mode of the PSU remains ON (not in an IStar mode) until the PSU loses power or until a controlled signal is received. If the magnitude of the controlled signal received from the supply bus is greater than the threshold for the IStar mode of Active ON, then the process proceeds to Step 244.

In Step 222, the IStar mode of the PSU is set to Active standby OFF. In Step 224, a drip timer is initialized. A drip timer is a timer within the PSU configured to measure a period of time during which the IStar mode of the PSU remains unchanged. If the IStar mode (e.g., Active standby OFF, Active ON), remains unchanged during the period of time measured by the drip timer, then the threshold for the IStar mode of Active standby OFF is incremented. In one or more embodiments of the invention, the drip timer is used in conjunction with the autonomous control of the PSU to increase the efficiency and reduce the power consumption of the PSU by incrementing the threshold for the IStar mode of Active standby OFF when operating conditions allow for such incrementing. Specifically, in one or more embodiments of the invention, the drip timer is used, in part, to maximize the threshold of the Active standby OFF IStar mode. The higher the threshold of the Active standby OFF IStar mode, the more that minimal power is consumed by the PSU. The autonomous control that is realized by operating in IStar allows a PSU to increment the threshold of the Active standby OFF IStar mode, using the drip timer, in a controlled and logical manner.

In Step 226, a determination is made as to whether a fault has been detected. In one or more embodiments of the invention, a fault is detected and communicated to the PSUs in the power supply system through a LLEM signal, where the LLEM signal is part of a LLEM control system, part of IStar, or part of some other control system. The fault may also be detected by one or more of the current share PSUs and communicated to the power supply system through a controlled signal using the supply bus. Further, a fault may be detected by the controller, and the controller may broadcast a fault signal to the PSUs. A fault may result from removal or loss of a PSU among the current share PSUs in the power supply system. A fault may also result from a fault of a PSU (e.g., trip due to overcurrent/overvoltage) or from loss of a power input feed to one or more PSUs in the power supply system. The signal communicating the fault detection information to the PSU may be a pulse. If a fault has been detected, then the process proceeds to Step 228. If a fault has not been detected, then the process proceeds to Step 234.

In one or more embodiments of the invention, a fault as described above with respect to Step 226 may be a normal fault or an excessive fault. A distinction between a normal fault and an excessive fault may be made using, for example, a fault counter used to count the number of faults within a period of time. If the count of the fault counter exceeds a threshold, then the fault is considered an excessive fault. In one or more embodiments of the invention, a normal fault may not be considered a fault by a PSU under IStar control, where an excessive fault may be considered to be a fault by a PSU under IStar control. In cases where a normal fault is not considered to be a fault according to the method of FIGS. 2A-2C, the PSU, controller, or some other module in the power supply system may be configured, while operating under IStar control, to measure an amount of time that the normal fault lasts. If the duration of a normal fault lasts beyond an amount of time, the normal fault may be considered to be an excessive fault. In one or more embodiments of the invention, the default value of the fault counter may be one, such that an excessive fault and a normal fault are treated the same under IStar.

In Step 228, the mode of the PSU is set to ON. In Step 230, IStar is disabled. In other words, the PSU leaves IStar mode Active standby OFF when a fault is detected in the power supply system and is turned on. In Step 232, a determination is made as to whether the fault has cleared. If the fault has not cleared, then the PSU remains in ON mode until the fault clears. If the fault has cleared, then the process proceeds to Step 268.

In Step 234, a determination is made as to whether the drip time threshold has been exceeded. The drip time threshold may be determined as part of the modes and thresholds received from the controller, as described above with respect to Step 210. The drip time threshold may also be determined as part of the autonomous control of the PSU. The drip time threshold may be held constant. The drip time threshold may also be adjusted, either according to fixed periods of time or due to certain operating conditions. Such operating conditions may include, but are not limited to, the current Active standby OFF threshold, the number of times the Active standby OFF threshold has been adjusted, and the proximity of the current Active standby OFF threshold to the default value of the Active standby OFF threshold. If the drip time threshold has been exceeded, then the process proceeds to Step 236. If the drip time threshold has not been exceeded, then the process proceeds to Step 238.

In Step 236, the Active standby OFF threshold is incremented. The amount of the increment of the Active standby OFF threshold may be predetermined. For example, the amount of the increment may be part of the modes and thresholds received from the controller, as described above with respect to Step 210. The amount of the increment of the Active standby OFF threshold may also be adjusted, either according to fixed periods of time or due to certain operating conditions. Such operating conditions may include, but are not limited to, the current Active standby OFF threshold, the number of times the Active standby OFF threshold has been adjusted, and the proximity of the current Active standby OFF threshold to the default value of the Active standby OFF threshold. Adjustments and/or determinations of the amount of the increment of the Active standby OFF IStar mode may be made by the PSU. The process then reverts to Step 216.

In Step 238, a determination is made as to whether the magnitude of the controlled signal exceeds the Active ON threshold. If the magnitude of the controlled signal does not exceed the Active ON threshold, then the process proceeds to Step 268. If the magnitude of the controlled signal exceeds the Active ON threshold, then the process proceeds to Step 240, where the count of the ON/OFF counter is incremented. After Step 240, the process proceeds to Step 244.

In Step 244, the IStar mode of the PSU is set to Active ON. In Step 246, a drip timer is initialized. The drip timer is substantially described above with respect to Step 224. The drip timer in Step 246 may be the same drip timer as in Step 224. Alternatively, the drip timer in Step 246 may be a separate timer from the drip timer in Step 224.

In Step 248, a determination is made as to whether a fault has been detected. In one or more embodiments of the invention, a fault is detected and communicated to the PSUs in the power supply system through a LLEM signal, where the LLEM signal is part of a LLEM control system, part of IStar, or part of some other control system. The fault may also be detected by one or more of the current share PSUs and communicated to the power supply system through a controlled signal using the supply bus. Further, a fault may be detected by the controller, and the controller may broadcast a fault signal to the PSUs. A fault may result from removal or loss of a PSU among the current share PSUs in the power supply system. A fault may also result from a fault of a PSU (e.g., trip due to overcurrent/overvoltage) or from loss of a power input feed to one or more PSUs in the power supply system. The signal communicating the fault detection information to the PSU may be a pulse. If a fault has been detected, then the process proceeds to Step 250. If a fault has not been detected, then the process proceeds to Step 256.

In one or more embodiments of the invention, a fault as described above with respect to Step 248 may be a normal fault or an excessive fault. A distinction between a normal fault and an excessive fault may be made using, for example, a fault counter to count the number of faults within a period of time. If the count of the fault counter exceeds a threshold, then the fault is considered an excessive fault. In one or more embodiments of the invention, a normal fault may not be considered a fault by a PSU under IStar control, where an excessive fault may be considered to be a fault by a PSU under IStar control. In cases where a normal fault is not considered to be a fault according to the method of FIGS. 2A-2C, the PSU, controller, or some other module in the power supply system may be configured, while operating under IStar control, to measure an amount of time that the normal fault lasts. If the duration of a normal fault lasts beyond an amount of time, the normal fault may be considered to be an excessive fault. In one or more embodiments of the invention, the default value of the fault counter may be one, such that an excessive fault and a normal fault are treated the same under IStar.

In Step 250, the mode of the PSU is set to ON. In Step 252, IStar is disabled. In other words, the PSU leaves IStar mode Active standby OFF when a fault is detected in the power supply system and is turned ON. In Step 254, a determination is made as to whether the fault has cleared. If the fault has not cleared, then the PSU remains in ON mode until the fault clears. If the fault has cleared, then the process proceeds to Step 266.

In Step 256, a determination is made as to whether the ON/OFF counter threshold has been exceeded for a period of time. In one or more embodiments of the invention, the ON/OFF counter has a threshold. The threshold may be predetermined. For example, the threshold of the ON/OFF counter may be part of the modes and thresholds received from the controller, as described above with respect to Step 210. The threshold of the ON/OFF counter may also be adjusted, either according to fixed periods of time or due to certain operating conditions. Such operating conditions may include, but are not limited to, the current Active standby OFF threshold, the number of times the Active standby OFF threshold has been adjusted, and the proximity of the current Active standby OFF threshold to the default value of the Active standby OFF threshold. Adjustments and/or initializations of the threshold of the ON/OFF counter may be made by the PSU. Further, delay filters may be used before determining whether the ON/OFF counter threshold has been exceeded for a period of time. If the ON/OFF counter threshold has been exceeded, then the process proceeds to Step 258. If the ON/OFF counter threshold has not been exceeded, then the process proceeds to Step 260.

In Step 258, the threshold for Active standby OFF IStar mode is decremented. The amount of the decrement of the Active standby OFF threshold may be predetermined. For example, the amount of the decrement may be part of the modes and thresholds received from the controller, as described above with respect to Step 210. The amount of the decrement of the Active standby OFF threshold may also be adjusted, either according to fixed periods of time or due to certain operating conditions. Such operating conditions may include, but are not limited to, the current Active standby OFF threshold, the number of times the Active standby OFF threshold has been adjusted, and the proximity of the current Active standby OFF threshold to the default value of the Active standby OFF threshold. Adjustments and/or determinations of the amount of the decrement of the Active standby OFF IStar mode may be made by the PSU. The process then reverts to Step 214.

In Step 260, a determination is made as to whether the drip time threshold has been exceeded. The drip timer threshold may be determined as part of the modes and thresholds received from the controller, as described above with respect to Step 210. The drip timer threshold may also be determined as part of the autonomous control of the PSU. The drip timer threshold may be held constant. The drip time threshold may also be adjusted, either according to fixed periods of time or due to certain operating conditions. Such operating conditions may include, but are not limited to, the current Active standby OFF threshold, the number of times the Active standby OFF threshold has been adjusted, and the proximity of the current Active standby OFF threshold to the default value of the Active standby OFF threshold. If the drip time threshold has been exceeded, then the process proceeds to Step 262. If the drip timer threshold has not been exceeded, then the process proceeds to Step 264.

In Step 262, the Active standby OFF threshold is incremented. The amount of the increment of the Active standby OFF threshold may be predetermined. For example, the amount of the increment may be part of the modes and thresholds received from the controller, as described above with respect to Step 210. The amount of the increment of the Active standby OFF threshold may also be adjusted, either according to fixed periods of time or due to certain operating conditions. Such operating conditions may include, but are not limited to, the current Active standby OFF threshold, the number of times the Active standby OFF threshold has been adjusted, and the proximity of the current Active standby OFF threshold to the default value of the Active standby OFF threshold. Adjustments and/or determinations of the amount of the increment of the Active standby OFF IStar mode may be made by the PSU. The process then reverts to Step 216.

In Step 264, a determination is made as to whether the magnitude of the controlled signal is less than the Active standby OFF threshold. If the magnitude of the controlled signal does not exceed the Active standby OFF threshold, then the process proceeds to Step 266. If the magnitude of the controlled signal exceeds the Active standby OFF threshold, then the process reverts to Step 222.

In Step 266, a determination is made as to whether input power has been lost to the PSU. If input power to the PSU has not been lost, then the process reverts to Step 248. If input power to the PSU has been lost, then the process proceeds to Step 269, where the mode of the PSU is set to ON.

In Step 268, a determination is made as to whether input power has been lost to the PSU. If input power to the PSU has not been lost, then the process reverts to Step 226. If input power to the PSU has been lost, then the process proceeds to Step 269, where the mode of the PSU is set to ON. After Step 269, the process proceeds to Step 270, where a power loss timer is initiated. In one or more embodiments of the invention, the power loss timer measures an amount of time that input power to the PSU has been lost.

In Step 272, a determination is made as to whether power to the PSU has been regained. If power to the PSU has been regained, then the process reverts to Step 204. If power to the PSU has not been regained, then the process proceeds to Step 274.

In Step 274, a determination is made as to whether a threshold for the power loss timer has been exceeded. The threshold may be set by default, by autonomous control of the PSU, by an administrator of the power supply system, by a controlled signal, or by some other suitable process. If the threshold for the power loss timer has not been exceeded, then the process reverts to Step 272. If the threshold for the power loss timer has been exceeded, then the process proceeds to Step 276. In Step 276, the mode of the PSU is set to OFF, ending the process. Alternatively, some other mechanism may be used instead of a power loss timer, to change the mode of the PSU from ON to OFF. Examples of such other mechanism may include, but is not limited to, the occurrence of an event and instructions within the control system.

Figure 3:
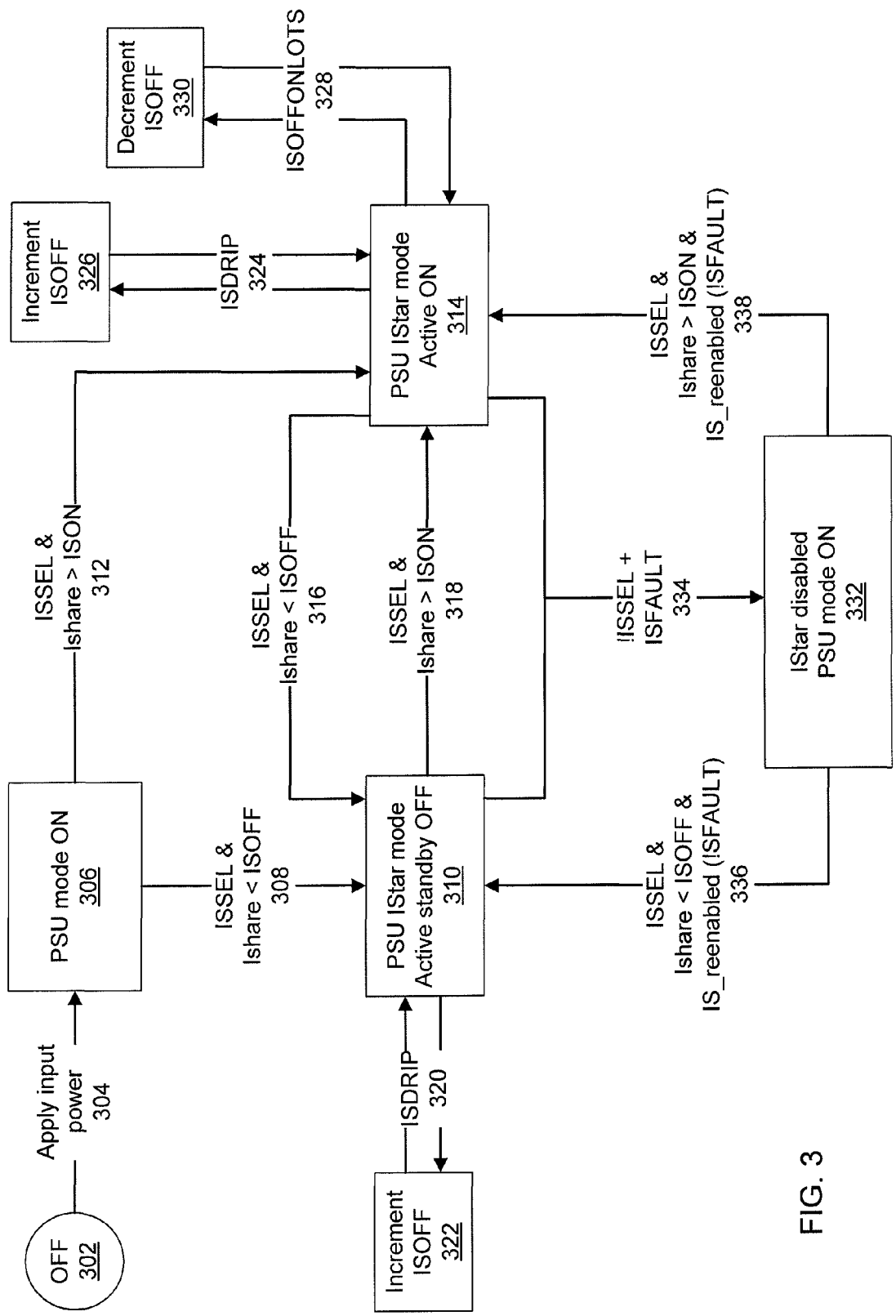
FIG. 3 shows a state diagram of a PSU under IStar control in accordance with one or more embodiments of the invention.

FIG. 3 shows a state diagram of a PSU under autonomous control using IStar in accordance with one or more embodiments of the invention. A change in a state of the state diagram is driven by one or more signals. A signal may be an actual signal, a controlled signal, a voltage, an event, or any suitable combination thereof.

In state 302, the PSU is OFF. In other words, the mode of the PSU is OFF, and the PSU is not in an IStar mode. When input power is applied (i.e., apply input power (304)), the mode of the PSU changes from OFF (302) to PSU mode ON (306). The input power may be received by the PSU from one or more power input feeds to the PSU. Also, during the change in states of the PSU from OFF (302) to PSU mode ON (306), the PSU may receive IStar modes and thresholds from a controller of the power supply system.

When the state of the PSU is PSU mode ON (306), IStar operation is enabled in the PSU, designated by "ISSEL" in FIG. 3. Further, a controlled signal, common to all current share PSUs in the power supply system, is received by the PSU. The designation for the controlled signal is "Ishare" in FIG. 3. If Ishare is less than the threshold for ISOFF (i.e., the IStar Active standby OFF threshold, designated as "ISOFF" in FIG. 3), and if ISSEL, then the state of the PSU changes from PSU mode ON (306) to PSU IStar mode Active standby OFF (310). Alternatively, when the state of the PSU is PSU mode ON (306), and if Ishare is greater than the threshold for ISON (i.e., the IStar Active ON threshold, designated as "ISON" in FIG. 3), then the state of the PSU changes to PSU IStar mode Active ON (314). As a third alternative, when the PSU is in mode ON (306), and if Ishare is greater than the threshold for ISOFF and less than the threshold for ISON, then the state of the PSU remains unchanged at PSU mode ON (306).

When the state of the PSU is PSU IStar mode Active standby OFF (310), a timer is set to determine whether the PSU remains in IStar mode Active standby OFF (310) for a certain period of time without a change in state. If the PSU remains in IStar mode Active standby OFF (310) for a certain period of time without a change in state, then the IStar drip indicator (designated by "ISDRIP" in FIG. 3) is triggered. When ISDRIP (320) is triggered, ISOFF is incremented (322). Once the Increment ISOFF (322) state has been performed, the state of the PSU reverts to PSU IStar mode Active standby OFF (310), where ISDRIP (320) may again be triggered if another amount of time has elapsed.

When the state of the PSU is PSU IStar mode Active standby OFF (310), the state of the PSU may also change to PSU IStar mode Active ON (314). For this change of state to occur, ISSEL must be true (i.e., IStar is active) and Ishare is greater than the threshold for ISON (318). Conversely, when the state of the PSU is PSU IStar mode Active ON (314), the state of the PSU may change to PSU IStar mode Active standby OFF (310). For this change of state to occur, ISSEL must be true (i.e., IStar is active) and Ishare is less than the threshold for ISOFF (316).

Alternatively, when the state of the PSU is PSU IStar mode Active ON (314), a timer is set to determine whether the PSU remains in IStar mode Active ON (314) for a certain period of time without a change in state. If the PSU remains in IStar mode Active ON (314) for a certain period of time without a change in state, then ISDRIP (324) is triggered. When ISDRIP (32) is triggered, ISOFF is incremented (326). Once the Increment ISOFF (326) state has been performed, the state of the PSU reverts to PSU IStar mode Active ON (314), where ISDRIP (324) may again be triggered if another amount of time has elapsed.

As another alternative, when the state of the PSU is PSU IStar mode Active ON (314), a counter (designated as "ISOFFONLOTS" (328) in FIG. 3) looks back over a period of time to determine whether the number of times that the state of the PSU changes from PSU IStar mode Active standby OFF (310) to PSU IStar mode Active ON (314) exceeds a threshold. If ISOFFONLOTS (328) is triggered, then Decrement ISOFF (330) becomes an enabled state. Decrement ISOFF (330) decreases the threshold for ISOFF by a certain amount. Once Decrement ISOFF (330) has been performed, the state of the PSU reverts to PSU IStar mode Active ON (314), where ISONOFFLOTS (328) may again be triggered if the number of times that the state of the PSU changes from PSU IStar mode Active standby OFF (310) to PSU IStar mode Active ON (314) again exceeds the threshold in the time period.

As an example of how the ISOFFONLOTS mechanism functions, assume that the time period is configured as the last two hours, and that the counter ("ISOFFONLOTS" (328)) is configured to trigger after the fourth time that the IStar mode of Active ON is enabled in the time period. Further, assume that the threshold for the IStar mode of Active standby OFF is 0.5V, and that the threshold for the IStar mode of Active ON is 0.55V. When the counter is triggered (i.e., within the past two hours, the IStar mode has gone, after starting in Active ON, from Active standby OFF to Active ON four times), then the threshold for the IStar mode of Active standby OFF is decremented. In this example, the threshold for the IStar mode of Active standby OFF is decremented from 0.5V to 0.48V.

If a fault occurs in the power supply system, an IStar fault indicator (designated as "ISFAULT" in FIG. 3) is triggered. Further, when ISFAULT is triggered, IStar is disabled (designated as "!ISSEL" in FIG. 3). Whether the state of the PSU is PSU IStar mode Active standby OFF (310) or PSU IStar mode Active ON (314), when !ISSEL+ISFAULT (334) (i.e., IStar is disabled and ISFAULT is triggered), then the state of the PSU changes to IStar disabled PSU mode ON (332).

To change states from IStar disabled PSU mode ON (332), the fault must be cleared (designated as "IS_reenabled (!ISFAULT)" in FIG. 3) and IStar must be reenabled (ISSEL). When IS_reenabled (!ISFAULT) and ISSEL, if Ishare is greater than the threshold for ISON, then the state of the PSU changes from IStar disabled PSU mode ON (332) to PSU IStar mode Active ON (314). Alternatively, when IS_reenabled (!ISFAULT) and ISSEL, if Ishare is less than the threshold for ISOFF, then the state of the PSU changes from IStar disabled PSU mode ON (332) to PSU IStar mode Active standby OFF (310).

The following describes an example in accordance with one or more embodiments of the invention. The example is for explanatory purposes only and is not intended to limit the scope of the invention. Terminology used in FIGS. 1A and 1B may be used in the example without further reference to FIGS. 1A and 1B.

EXAMPLE

Figure 4:
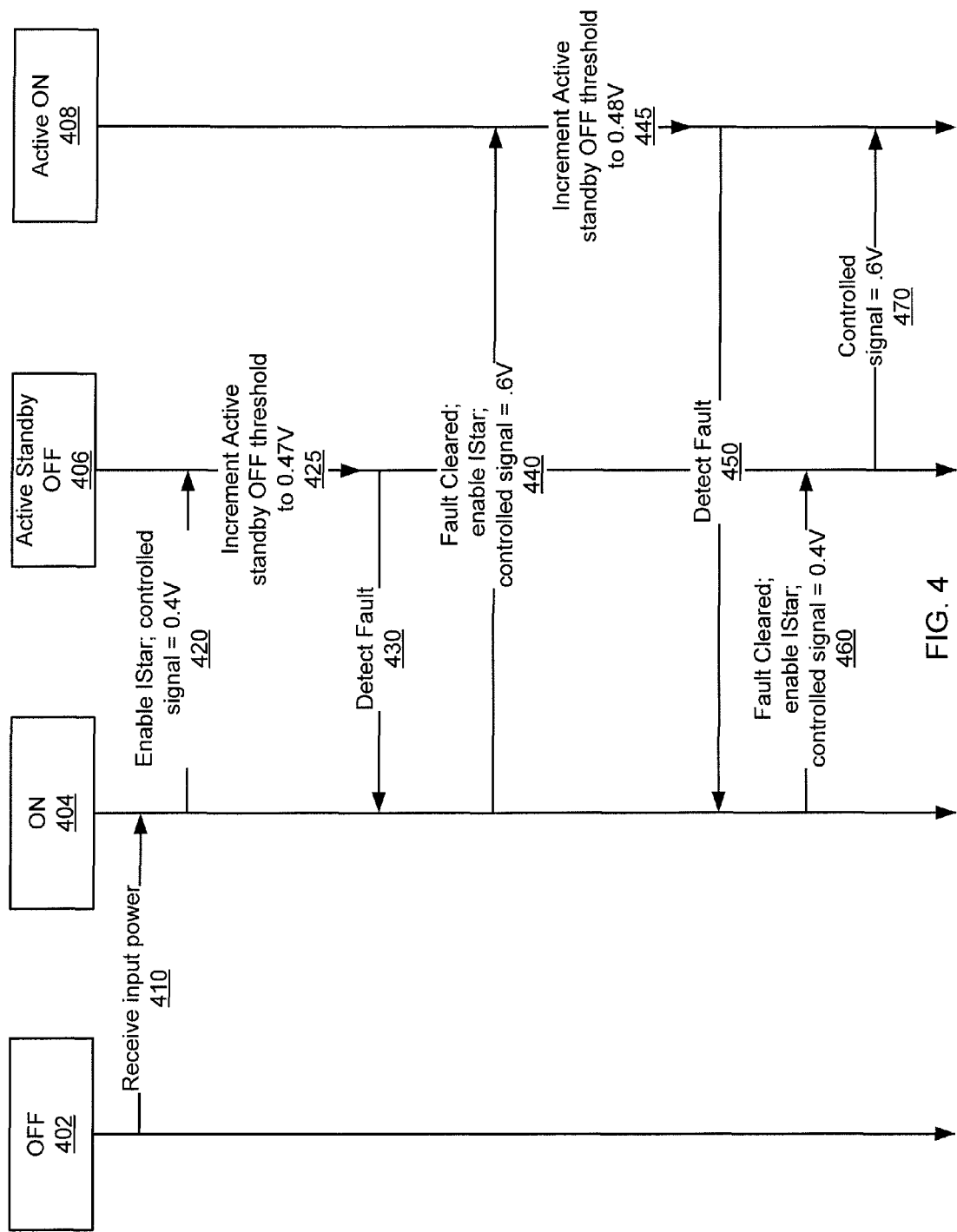
FIG. 4 shows an example of a sequence of events in accordance with one or more embodiments of the invention.

Consider the following example, as illustrated in FIG. 4, which describes autonomous control of a PSU among current share PSUs in a power supply system in accordance with one or more embodiments described above. The example shows modes (both IStar modes and non-IStar modes) over time based on different events. Specifically, FIG. 4 shows the non-IStar modes of OFF (402) and ON (404) and the IStar modes of Active standby OFF (406) and Active ON (408). Each event in the series of time is accompanied by a description of the event as well as the modes and/or IStar modes involved.

The initial event (410) is "receive input power." The input power turns on the PSU, which changes the mode of the PSU from OFF (402) to ON (404). At this point in the Example, IStar is not enabled.

The subsequent event (420) is "Enable IStar; controlled signal=0.4V." As discussed above, before enabling IStar, the IStar modes and thresholds are received by each of the current share PSUs in the power supply system. IStar may be enabled by the controller, by the controlled signal, or by some other suitable device or signal. In this example, 0.4V is less than the threshold for the IStar mode of Active standby OFF, and so the mode of the PSU changes from ON (404) to Active standby OFF (406). In this example, the threshold for the IStar mode of Active standby OFF is 0.46V.

The subsequent event (425) is "Increment Active standby OFF threshold to 0.47V." This event corresponds to the PSU remaining in IStar mode Active standby OFF for an amount of time in excess of a time counted of a drip timer (e.g., one hour). As explained above, when the IStar mode remains Active standby OFF beyond the time counted by the drip timer, then the PSU autonomously increments the threshold for the IStar mode of Active standby OFF. The threshold for Active standby OFF is incremented in an effort to conserve more energy by the PSU by keeping the PSU in the IStar mode of Active standby OFF for as long as possible.

The subsequent event (430) is "Detect Fault." In one or more embodiments of the invention, a fault is the loss of one or more PSUs in the power supply system. In this example, the detection of the fault changes the mode of the PSU from Active standby OFF (406) to ON (404). In other words, detection of the fault causes the PSU to exit from IStar control.

The subsequent event (440) is "Fault cleared; enable IStar; controlled signal=0.6V." The problem that caused the fault in the previous event has been remedied. Also, IStar has been reenabled in the PSU. In this example, 0.6V is greater than the threshold for the IStar mode of Active ON, and so the mode of the PSU changes from ON (404) to Active ON (408).

The subsequent event (445) is "Increment Active standby OFF threshold to 0.48V." This event corresponds to the PSU remaining in IStar mode Active ON for an amount of time in excess of a time counted by a drip timer (e.g., 30 minutes). The drip timer used in this event (445) may be a different drip timer than the drip timer used in previous event (425). As explained above, when the IStar mode remains Active ON beyond the time counted by the drip timer, then the PSU autonomously increments the threshold for the IStar mode of Active standby OFF. The threshold for Active standby OFF is incremented in an effort to conserve more energy by the PSU by keeping the PSU in the IStar mode of Active standby OFF for as long as possible.

The subsequent event (450) is "Detect Fault." As in the previous "Detect Fault" event (430), one or more PSUs in the power supply system has been lost. In this example, the detection of the fault changes the mode of the PSU from Active ON (408) to ON (404). In other words, detection of the fault causes the PSU to exit from IStar control.

The subsequent event (460) is "Fault cleared; enable IStar; controlled signal=0.4V." The problem that caused the fault in the previous event has been remedied. Also, IStar has been reenabled in the PSU. As was previously the case in this example, 0.4V is less than the threshold for the IStar mode of Active standby OFF, and so the mode of the PSU changes from ON (404) to Active standby OFF (406). In this example, the IStar modes and thresholds remain unchanged, so the threshold for the IStar mode of Active standby OFF remains at 0.48V.

The final event (470) is "Controlled signal=0.6V." IStar remains active for this event, and the controlled signal has increased by 0.2V. As was previously the case in this example, 0.6V is greater than the threshold for the IStar mode of Active ON, and so the mode of the PSU changes from Active standby OFF (406) to Active ON (408). In this example, the threshold for the IStar mode of Active ON is 0.58V.

One or more embodiments of the invention enable autonomous control of operation of a PSU. Such autonomous control may improve energy efficiency and reduce energy consumption. The aforementioned benefits of using embodiments of the invention are particularly realized when a PSU operates at relatively low output power levels (less than 25%, or when a PSU is typically in "idle" or "standby" mode) relative to full power capability for the PSU. When a current share PSU is under IStar control, the standby mode is Active standby OFF, which requires less power because unnecessary functions are quiesced. Specifically, by using one or more embodiments of the invention, more than 50% energy savings may be realized relative to current methods of PSU operation when a PSU is in standby mode or a mode where less than 25% of the system capacity of the PSU is being used. Embodiments of the invention applied to a power supply system that includes eight PSUs use approximately three thousand kilowatt-hours less power per year than when the same power supply system operates using current control technologies. If a consumer pays $0.10 per kilowatt-hour, then the consumer may realize $300 in annual savings by using the IStar control with the power supply system.

Embodiments of the invention also maintain or improve operational integrity of the PSU. By enabling autonomous control, a PSU does not rely on a controller to constantly monitor all PSUs in a power supply system. In fact, in most instances during operation, after receiving initial modes and thresholds, each PSU in a current share PSU system operates to control its modes of operation and adjust thresholds to operate at increased efficiency, particularly at low loads. By using embodiments of the invention, a PSU may adjust threshold levels of its own different operating modes to reduce energy consumption and increase performance.

Further, use of embodiments of a charging module in a PSU under IStar control show both an additional reduction in energy consumption and an additional increase in power system performance by reducing latency. The charging module enables more efficient operation of the PSU in the IStar mode of Active standby OFF. The charging module also enables a faster transition in IStar mode from Active standby OFF to Active ON. Embodiments of the invention may also decrease latency when changing modes of the PSU from standby to ON (outside of IStar control) in addition to instances when changing IStar modes from Active standby OFF to Active ON. In other words, when a PSU among current share PSUs in a power supply system receives a controlled signal to change its status from standby to active/ON, embodiments of the invention reduce the latency during which the transition takes place. Reducing latency in changing modes for the PSU may, at least, increase reliability of the PSU and/or the power supply system. Specifically, by using one or more embodiments of the invention incorporating a charging module, the latency, when changing the mode of a PSU from standby to on, may be two milliseconds or less.

Software instructions, when executed by a processor(s), to perform embodiments of the invention may be stored on a computer readable medium such as a compact disc (CD), a diskette, a tape, a register (e.g., (112A), (112N)), memory (e.g., (114A), (114N)), or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for autonomous control by a power supply unit (PSU) among a plurality of current share PSUs in a power supply system, the method comprising:
   receiving, by the PSU, input power from a power input feed;
   setting a mode of the PSU to ON;
   receiving, from a controller using a supply bus shared by the plurality of current share PSUs, a first controlled signal comprising a first plurality of IStar modes and thresholds for the PSU;
   receiving a first activation signal activating IStar in the PSU;
   receiving, from the plurality of current share PSUs using the supply bus, a second controlled signal comprising a first voltage;
   determining that the first voltage is less than a first Active standby OFF threshold for an IStar mode of Active standby OFF for the PSU;
   setting the IStar mode for the PSU to Active standby OFF from the mode of ON;
   receiving, from the plurality of current share PSUs using the supply bus, a third controlled signal comprising a second voltage;
   determining that the second voltage is greater than a first Active ON threshold for an IStar mode of Active ON for the PSU; and
   setting the IStar mode for the PSU to Active ON.

2. The method of claim 1, further comprising:
initializing, in response to the first voltage, a first drip timer configured to count a first amount of time;
determining, after the first amount of time has elapsed, that the PSU remains in Active standby OFF mode;
incrementing the first Active standby OFF threshold by a first incremental voltage to generate a second Active standby OFF threshold; and
reinitializing the first drip timer,
wherein the IStar mode for the PSU is set to Active standby OFF when a fourth controlled signal comprises a third voltage that is less than the second Active standby OFF threshold.

3. The method of claim 2, further comprising:
initializing, in response to the second voltage, a second drip timer configured to count a second amount of time;
determining, after the second amount of time has elapsed, that the PSU remains in Active ON mode;
incrementing the first Active standby OFF threshold by a second incremental voltage to generate a third Active standby OFF threshold; and
reinitializing the second drip timer,
wherein the IStar mode for the PSU remains set to Active ON until a fifth controlled signal comprising a fourth voltage that is less than the third Active standby OFF threshold is received.

4. The method of claim 3, wherein the third Active standby OFF threshold is less than a default Active standby OFF value received with the first controlled signal.

5. The method of claim 4, wherein the default Active standby OFF value is less than the first Active ON threshold.

6. The method of claim 1, further comprising:
setting a count of an ON/OFF counter to zero;
incrementing the count of the ON/OFF counter each time the IStar mode changes from Active standby OFF to Active ON;
determining that the count of the ON/OFF counter exceeds an ON/OFF threshold for a period of time;
decrementing the first Active standby OFF threshold by a first decremental voltage to generate a second Active standby OFF threshold; and
resetting, after decrementing, the count of the ON/OFF counter to zero.

7. The method of claim 1, further comprising:
receiving, from the controller, a fault signal resulting from a fault in the power supply system;
setting, in response to the fault signal, the mode of the PSU to ON;
disabling, in response to setting the mode of the PSU to ON, IStar;
receiving, from the controller, a fourth controlled signal comprising a second plurality of IStar modes and thresholds, wherein the fourth controlled signal is generated in response determining that the fault in the power supply system has cleared; and
receiving a second activation signal activating IStar in the PSU.

8. The method of claim 7, further comprising:
receiving, from the plurality of current share PSUs using the supply bus, a fifth controlled signal comprising a third voltage, wherein the third voltage is less than the first Active ON threshold and greater than the first Active standby OFF threshold; and
maintaining the mode of the PSU at ON.

9. The method of claim 8, further comprising:
receiving, from the plurality of current share PSUs using the supply bus, a sixth controlled signal comprising a fourth voltage, wherein the fourth voltage is less than the first Active standby OFF threshold; and
setting the IStar mode for the PSU to Active standby OFF from the mode of ON.

10. The method of claim 1, further comprising:
detecting a loss of input power from the power input feed to the PSU; and
setting, in response to the detecting, the mode of the PSU to ON.

11. A system for autonomous control by a power supply unit (PSU) among a plurality of current share PSUs in a power supply system, the system comprising:
a supply bus comprising a voltage rail, the supply bus and voltage rail operatively connected to each current share PSU within the power supply system;
a plurality of power input feeds, wherein each of the plurality of power input feeds provides input voltage to one of the plurality of current share PSUs; and
the plurality of current share PSUs, wherein each of the plurality of current share PSUs comprises memory storing instructions executed by a central processing unit (CPU), a charging module comprising a resistor and a switch, and a switching regulator comprising an output capacitor, wherein the PSU is configured to:
receive input power from one of the plurality of power input feeds;
set a mode of the PSU to ON;
receive, from a controller using the supply bus shared by the plurality of current share PSUs, a first controlled signal comprising a first plurality of IStar modes and thresholds for the PSU;
receive a first activation signal activating IStar in the PSU;
receive, from the plurality of current share PSUs using the supply bus, a second controlled signal comprising a first voltage;
determine that the first voltage is less than a first Active standby OFF threshold for an IStar mode of Active standby OFF for the PSU;
set the IStar mode for the PSU to Active standby OFF from the mode of ON;
receive, from the plurality of current share PSUs using the supply bus, a third controlled signal comprising a second voltage;
determine that the second voltage is greater than a first Active ON threshold for an IStar mode of Active ON for the PSU; and
set the IStar mode for the PSU to Active ON.

12. The system of claim 11, wherein the PSU is further configured to:
initialize, in response to the first voltage, a first drip timer configured to count a first amount of time;
determine, after a lapse of the first amount of time, that the PSU remains in Active standby OFF mode;
increment the first Active standby OFF threshold by a first incremental voltage to generate a second Active standby OFF threshold; and
reinitializing the first drip timer,
wherein the IStar mode for the PSU is set to Active standby OFF when a fourth controlled signal comprises a third voltage that is less than the second Active standby OFF threshold.

13. The system of claim 12, wherein the PSU is further configured to:
initialize, in response to the second voltage, a second drip timer configured to count a second amount of time;

determine, after a lapse of the second amount of time, that the PSU remains in Active ON mode;
increment the first Active standby OFF threshold by a second incremental voltage to generate a third Active standby OFF threshold;
reinitialize the second drip timer,
wherein the IStar mode for the PSU remains set to Active ON until a fifth controlled signal comprising a fourth voltage that is less than the third Active standby OFF threshold is received.

14. The system of claim 11, wherein the PSU is further configured to:
set a count of an ON/OFF counter to zero;
increment the count of the ON/OFF counter each time the IStar mode changes from Active standby OFF to Active ON;
determine that the count of the ON/OFF counter exceeds an ON/OFF threshold for a period of time;
decrement the first Active standby OFF threshold by a first decremental voltage to generate a second Active standby OFF threshold; and
reset the count of the ON/OFF counter to zero.

15. The system of claim 11, wherein the PSU is further configured to:
receive, from the controller, a fault signal resulting from a fault in the power supply system;
set, in response to the fault signal, the mode of the PSU to ON;
disable, in response to setting the mode of the PSU to ON, IStar;
receive, from the controller, a fourth controlled signal comprising a second plurality of IStar modes and thresholds, wherein the fourth controlled signal is generated in response determining that the fault in the power supply system has cleared; and
receive a second activation signal activating IStar in the PSU.

16. The system of claim 15, wherein the PSU is further configured to:
receive, from the plurality of current share PSUs using the supply bus, a fifth controlled signal comprising a third voltage, wherein the third voltage is less than the first Active ON threshold and greater than the first Active standby OFF threshold; and
maintain the mode of the PSU at ON.

17. The system of claim 16, wherein the PSU is further configured to:
receive, from the plurality of current share PSUs using the supply bus, a fifth controlled signal comprising a fourth voltage, wherein the fourth voltage is less than the first Active standby OFF threshold; and
set the IStar mode for the PSU to Active standby OFF from the mode of ON.

18. The system of claim 11, wherein the PSU is further configured to:
detect a loss of input power from the power input feed to the PSU; and
set the mode of the PSU to ON.

19. A non-transitory computer readable medium comprising computer readable program code embodied therein for causing a power supply unit (PSU) among a plurality of PSUs to perform a method, the method comprising:
receiving, by the PSU, input power from a power input feed;
setting a mode of the PSU to ON;
receiving, from a controller using a supply bus shared by the plurality of current share PSUs, a first controlled signal comprising a first plurality of IStar modes and thresholds for the PSU;
receiving a first activation signal activating IStar in the PSU;
receiving, from the plurality of current share PSUs using the supply bus, a second controlled signal comprising a first voltage;
determining that the first voltage is less than a first Active standby OFF threshold for an IStar mode of Active standby OFF for the PSU;
setting the IStar mode for the PSU to Active standby OFF from the mode of ON;
receiving, from the plurality of current share PSUs using the supply bus, a third controlled signal comprising a second voltage;
determining that the second voltage is greater than a first Active ON threshold for an IStar mode of Active ON for the PSU; and
setting the IStar mode for the PSU to Active ON.

* * * * *